KESLER & REINHARD.
Cotton-Planter.

No. 26,596.　　　　　　　　　　　　　　　　Patented Dec. 27, 1859.

Witnesses:
W. B. Denny
E. P. Whitfield

Inventors:
Charles Kesler
Fred Reinhard

UNITED STATES PATENT OFFICE.

CHARLES KESLER AND F. REINHARD, OF COLUMBUS, TEXAS.

IMPROVEMENT IN COTTON-SEED PLANTERS.

Specification forming part of Letters Patent No. 26,596, dated December 27, 1859.

*To all whom it may concern:*

Be it known that we, CHARLES KESLER and F. REINHARD, both of Columbus, in the county of Colorado and State of Texas, have invented a new and Improved Cotton-Seed Planter; and we do hereby declare that the following is a full, clear, and exact description of the same, reference being had to the accompanying drawings, forming a part of this specification, in which—

Figure 1:
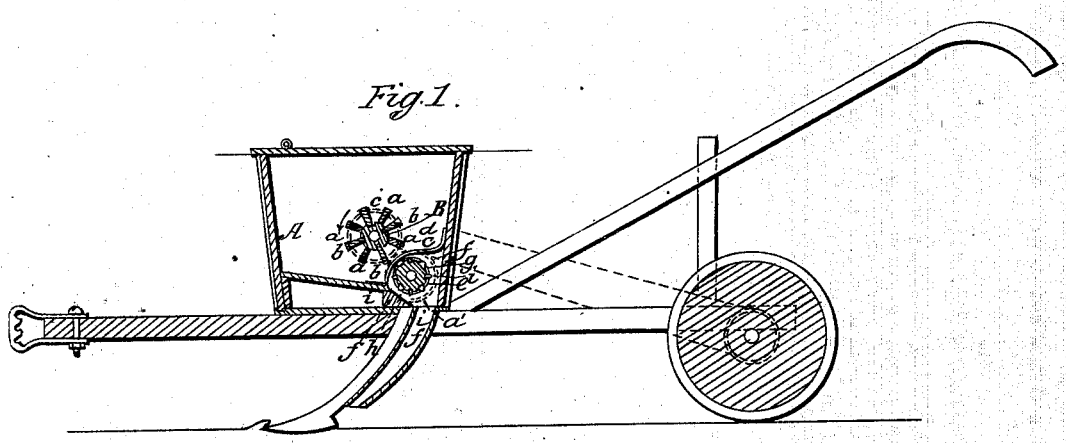
Figure 2:
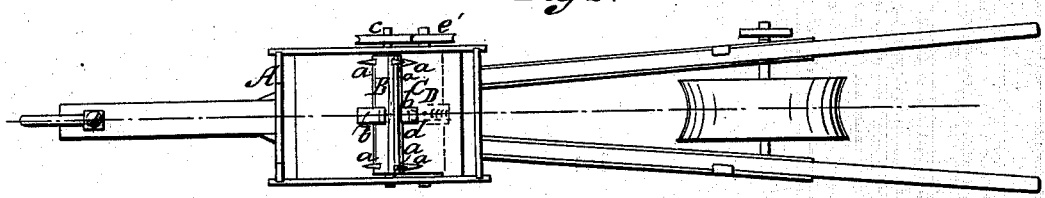

Figure 1 represents a longitudinal vertical section of our invention, and Fig. 2 is a plan or top view of same.

Similar letters of reference indicate corresponding parts in the two figures.

This invention consists in arranging in a hopper a roller armed with stirring and feeding teeth, in combination with an inclined perforated partition and a distributing-roller with seed-cells, which latter are filled by the action of the toothed roller, so as to insure a correct distribution of the seed.

To enable those skilled in the art to make and use our invention, we will proceed to describe it.

A represents the hopper of a seed-planter, arranged in the usual manner on a beam provided with handles and supported by a wheel or wheels, so as to be able to draw it from place to place and to direct its motions. The bottom of this hopper is furnished with an aperture, $a'$, through which the seed is discharged into a separate tube, or into a hollow tubular hoe, in the usual manner. Arranged in the interior of this hopper is a roller, B, furnished with stirring-teeth $a$ and with feeding-teeth $b$, and driven by a pulley, $c$, from a corresponding pulley on the driving-axle. The stirring-teeth are simply round pins, flattened down at the points and firmly inserted into the surface of the roller. The feeding-teeth, on the other hand, form hooks whereby they are enabled to take hold of the cotton-seed, separate it, and bring it to the seed-cells. Under this toothed roller, and attached to the bottom and to one side of the hopper, is the curved partition C, which is perforated with an aperture, $d$, to admit the seed to the distributing-roller D, which is situated under the partition C on an axle, $e$, and to which motion is imparted from the same pulley and by the same belt that serves to drive the toothed roller B by means of a pulley, $e'$. The surface of the distributing-roller is provided with a series of seed-cells, $f$, that are connected by a groove, $g$, and it runs close over a brush, $h$, that serves to retain the surplus seed, which may be carried off by one or the other of the seed-cells. Spikes $i$, inserted into the roller between the seed-cells, serve to clean out the brush if some of the seed should get caught between the bristles. Without the groove $g$ the seed from the hopper would be discharged only when one of the seed-cells $f$ comes under the aperture $d$ in the partition C; but with the groove and by the aid of the spikes $i$ the seed continues to be discharged as long as the roller D is rotated.

By the combined action of the toothed roller B and the distributing-roller D the seed is discharged perfectly regular, so that a field planted by the aid of our planter grows more regular than if any other contrivance for distributing the seed is used.

Having thus fully described our invention, what we claim as new, and desire to secure by Letters Patent, is—

The arrangement, in a hopper, of the roller B with stirring-teeth $a$ and feeding-teeth $b$, in combination with the perforated partition C and the distributing-roller D, substantially as and for the purpose specified.

CHARLES KESLER.
FRED REINHARD.

Witnesses:
W. B. DEWEES,
E. P. WHITFIELD.